(12) United States Patent
Harvie

(10) Patent No.: US 7,152,412 B2
(45) Date of Patent: *Dec. 26, 2006

(54) PERSONAL BACK REST AND SEAT COOLING AND HEATING SYSTEM

(76) Inventor: Mark R. Harvie, 1150 Airport Dr., South Burlington, VT (US) 05403

( * ) Notice: Subject to any disclaimer, the term of this patent is extended or adjusted under 35 U.S.C. 154(b) by 142 days.

This patent is subject to a terminal disclaimer.

(21) Appl. No.: 10/775,418

(22) Filed: Feb. 10, 2004

(65) Prior Publication Data
US 2004/0177622 A1   Sep. 16, 2004

Related U.S. Application Data

(63) Continuation-in-part of application No. 10/754,429, filed on Jan. 9, 2004, now Pat. No. 6,915,641.

(60) Provisional application No. 60/439,972, filed on Jan. 14, 2003.

(51) Int. Cl.
F25B 21/02 (2006.01)
F25D 23/12 (2006.01)
B60H 1/32 (2006.01)

(52) U.S. Cl. .......................... 62/3.5; 62/3.3; 62/259.3; 62/244

(58) Field of Classification Search .................. 62/3.5, 62/3.3, 259.3, 244; 607/261, 289
See application file for complete search history.

(56) References Cited

U.S. PATENT DOCUMENTS 3,085,405 A * 4/1963  Frantti .......................... 62/3.5
5,092,129 A * 3/1992  Bayes et al. .................. 62/3.3
5,564,276 A * 10/1996 Abadilla et al. .............. 62/3.7
5,755,275 A * 5/1998  Rose et al. ................. 165/46
5,967,225 A * 10/1999 Jenkins ........................ 165/46
6,508,831 B1 * 1/2003  Kushnir ....................... 607/104

FOREIGN PATENT DOCUMENTS

WO    WO 9944552 A1 * 9/1999

* cited by examiner

*Primary Examiner*—Chen Wen Jiang
(74) *Attorney, Agent, or Firm*—Eric R. Benson, Esq.

(57) ABSTRACT

This invention relates to a fully adjustable personal back rest and seat cooling and heating system specifically designed to provide several hours of high efficiency cooling or heating when used by a user as either a seat cushion and back or a mattress or sleeping surface. This combination personal back rest and seat cooling and heating system invention is capable of delivering several hours of high efficiency personal cooling or heating without the use of caustic or toxic chemicals with virtually no risk of injury associated with its use. This personal back rest and seat cooling and heating system invention is portable, battery powered, lightweight and durable in construction and specifically designed for use in harsh climatic conditions where access to refrigeration and heating are limited or unavailable.

16 Claims, 9 Drawing Sheets

PERSONAL BACK REST AND SEAT COOLING AND HEATING SYSTEM

CROSS REFERENCE TO RELATED APPLICATION

This Application is a Continuation-In-Part of the patent application U.S. Ser. No. 10/754,429 filed Jan. 9, 2004, now U.S. Pat. No. 6,915,641, which claims priority from Provisional Patent Application No. 60/439,972 which was filed on Jan. 14, 2003.

BACKGROUND ART

There are no acceptable prior art heat stress and cold weather exposure relief systems for individuals, such as soldiers, operating in hot and cold environments for extended periods of time. Desert conditions for example often place individuals in a heat stress environment during the daylight hours and in severe cold during the nighttime. Heat stress can result in sweating, fatigue, dehydration, dizziness, hot skin temperature, muscle weakness, increased heart rate, heat rash, fainting, injuries, weight loss, heat stroke, heat exhaustion, and even death. The risk of heat stress and/or cold exposure is even greater for aircrew personnel wearing flight gear that often must wait in oppressive heat and cold conditions in closed aircraft that are not permitted to be running to provide heat or air conditioning while awaiting orders, sometimes for extended periods of time. Often open vehicles such as Jeeps are exposed to the hot sun, especially in city and desert type driving, and the need for a cooled seat and back rest can be critical.

Sportsmen in open boats often experience heat stress or cold exposure while exposed to the environment engaged in a host of activities. Campers are often exposed to weather extremes while engaged in various activities or while at rest either lounging in camp or at sleep. Cold weather exposure can cause discomfort; pain; numbness; cardiac, circulatory and respiratory problems; diminished muscle function and performance; frostbite, and hypothermia which can lead to unconsciousness and death.

While a portable, lightweight, low power, personal cooling and heating system can reduce heat stress, reduce the adverse effects of cold exposure, improve performance, and reduce water consumption, current active and passive cooling systems fall short of meeting the minimum requirements for an optimal system.

Active personal cooling devices are well know in the prior art. Also active personal heating systems are known in the prior art. The prior art, however, seems to be devoid of a combination cooling and heating system functioning with any significant efficiency over longer periods of time. The current active cooling and heating systems, however, are too heavy, bulky, inefficient, and are effective for only a limited amount of time. These devices also consume too much power and use potentially dangerous materials such as lithium sulfur dioxide batteries or R134a refrigerant. Passive cooling and heating systems use packets containing phase change chemicals, water or gel that require refrigeration, freezing or heating before use are not suitable to meet the needs of a user where refrigeration, freezing or heating of the passive cooling or heating components are unavailable such as in military field operations, camping or recreational activities in hot, cold or combined hot and cold climatic conditions. The prior art active cooling and heating systems that have been developed, include:

1. U.S. Army PICS (Personal Ice-Cooling System) Problem: This system uses packed ice. The ice must be changed every 30 minutes, and users such as pilots and field deployed soldiers may not have access to ice to replenish the system.
2. U.S. Army PVCS (Portable Vapor Compression Cooling System) Problems: The total system is much too heavy (27 pounds); uses potentially dangerous lithium sulphur dioxide batteries, can't use vapor compression on non-level surfaces such as ships; R134a containers can rupture in high temperatures, exposure to liquid or vapor refrigerant can cause frostbite, high exposure to fumes can cause central nervous system depression, irregular heartbeat and suffocation.
3. U.S. Army ALMCs (Advanced Lightweight Microclimate Cooling System) Problems: A voltage delay phenomenon can cause lithium sulphur dioxide batteries not to start especially after storage; the batteries can vent toxic sulphur dioxide gas that can cause respiratory distress and burns if there is accidental electrical charging, puncturing or application of heat. The batteries are not rechargeable, cannot be exposed to high temperatures, are very reactive with water and cannot be opened, punctured or crushed.
4. IMCC (Integrated Mesoscopic Cooling Circuits) (DARPA) Problem: Insufficient cooling.
5. Absorption/Evaporative Cooling (DARPA). Problem: According to Roger Masadi at the Natick Soldier Center, typical desiccants only adsorb about 20 percent of their weight in water, and the cooling density is approximately the same as ice.
6. NASA and U.S. Air Force (APECS) Aircrew Personal Environmental Control System Problem: This system is too bulky for infantry soldiers.
7. Life Enhancement Technologies Problem: The ice water mixture for the cooling unit must be replenished.

While each of these prior art personal back rest and seat cooling and heating systems may fulfill their respective particular objectives and requirements, and are most likely quite functional for their intended purposes, it will be noticed that none of the prior art cited disclose an apparatus and/or method that is portable, rugged, and lightweight and that can be used in any orientation or used as a portable self powered unit, to meet the operational requirements of the user. Also, the prior art cannot provide several continuous hours of operation at a rate of 700 to 1000 BTUs of adjustable cooling or heating per hour.

As such, there apparently still exists the need for new and improved personal back rest and seat cooling and heating system to maximize the benefits to the user and minimize the risks of injury from its use.

In this respect, the present invention disclosed herein substantially corrects these problems and fulfills the need for such a device.

DISCLOSURE OF THE INVENTION

In view of the foregoing limitations inherent in the known types of personal back rest and seat cooling and heating systems now present in the prior art, the present invention provides an apparatus that has been designed to provide the following features for a user:

Minimum of 700 to 1000 BTUs of adjustable heating or cooling per hour.

Maximum system weight of 8 pounds including back rest and seat, coolant and battery power source.

Easily converted from a back rest and seat to a mattress to provide a heating and/or cooling sleeping surface.

Minimum of two hours of continuous operation.
On-demand cooling and heating.
2000 failure-free hours.
Self-powered.
Resistant to chemical agents.
Easily decontaminated.
Easy to maintain with a minimum of hand tools.
Safe to the touch.
Power supply compatibility with other flight line or aircraft systems.
Compliance with electromagnetic compatibility and interface (EMC/EMI) requirements.
The system can be operated and recharged by ground power cart or aircraft power.

These features are improvements which are patently distinct over similar devices and methods which may already be patented or commercially available. As such, the general purpose of the present invention, which will be described subsequently in greater detail, is to provide a field designed apparatus and method of use that incorporates the present invention. There are many additional novel features directed to solving problems not addressed in the prior art.

To attain this the present invention generally comprises four main components: 1) the Cooling Unit (CU); 2) the Heating Unit (HU); 3) the Power Supply (PS); and 4) the Back Rest and Seat.

An additional object and advantage of the present invention is that unlike the prior art personal back rest and seat cooling and heating systems the present invention provides a fully user adjustable cooling and heating system that combines efficient cooling and heating in one device maximizing user comfort. The controls are easy to use and the unit is durable for use in the field, including military operations.

These together with other objects of the invention, along with the various features of novelty which characterize the invention, will be pointed out with particularity in the claims. For a better understanding of the invention, its operating advantages and the specific objects attained by its uses, reference should be had to the accompanying drawings and descriptive matter in which there is illustrated preferred embodiments of the invention.

BEST MODES FOR CARRYING OUT THE INVENTION

A. Preferred Embodiments

Figure 1:
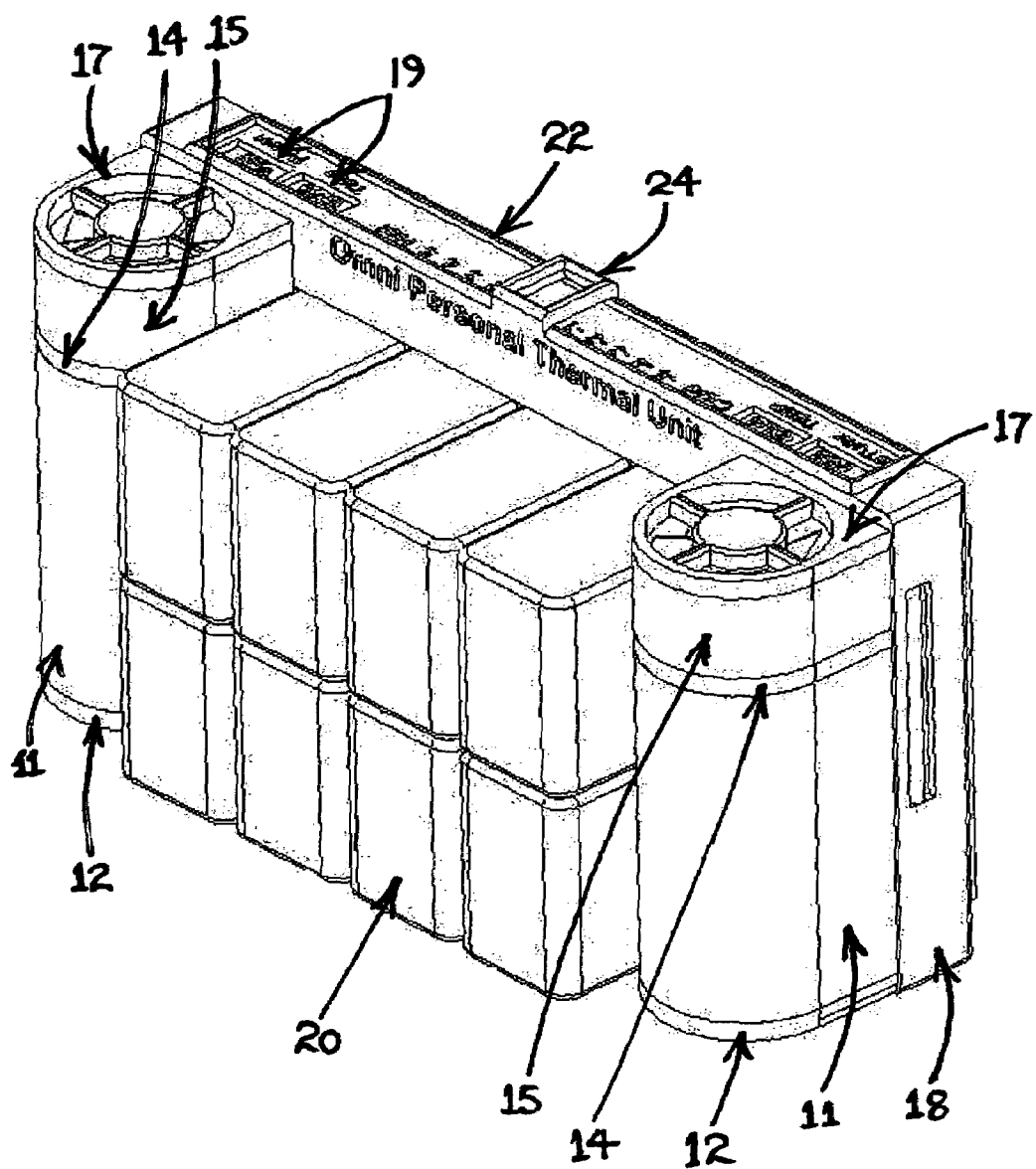
FIG. 1 is a perspective view of the personal cooling and heating unit of the invention.

With reference now to the drawings, and in particular to FIGS. 1–9 thereof, a new and novel apparatus for a personal back rest and seat cooling and heating system (PCHS) embodying the principles and concepts of the present invention is depicted in these drawings as comprising three major components: the Back Rest; the Seat; and the Personal Cooling and Heating Unit (PCHU) and are generally designated by the reference numerals 21A, 21B and 22 respectively.

General Description of Reference Numerals in the Description and Drawings

Any actual dimensions listed are those of the preferred embodiment. Actual dimensions or exact hardware details and means may vary in a final product or most preferred embodiment and should be considered means for so as not to narrow the claims of the patent.

List and Description of Component Parts of the Invention:
 (1) Reversible Thermoelectric Cooler (TEC) Modules.
 (2) Liquid Heat Exchanger Frame
 (2A) Back Rest and Seat Loop Liquid Heat Exchanger
 (2B) Cooling Loop Liquid Heat Exchanger
 (2C) Condenser Loop Liquid Heat Exchanger
 (3) Temperature Sensor
 (4) Hot Side Silicon Sealing Gasket
 (5) Cold Side Silicon Sealing Gasket
 (6) Hot Side Liquid Heat Exchanger Back Plate
 (7) Cold Side Liquid Heat Exchanger and Heater Transfer Plate Back Plate
 (8) Electric Heating Strip
 (9) Heat Reflector and Insulator Pad
 (10) Insulating and Cushioning Pad
 (11) Air Heat Exchanger
 (12) Air Heat Exchanger Discharge End Cap
 (13) Brushless Fan Motor
 (14) Air Heat Exchanger Fan End Cap
 (15) Fan Impeller Housing
 (16) Air Heat Exchanger Fan
 (16A) Air Heat Exchanger Fan Impeller
 (16B) Cooling Fin Fan
 (17) Fan Housing Cap
 (18) Wiring, Plumbing and Controller Enclosure
 (19) Micro Controller, Display and Keypad
 (20) Battery Power Supply
 (21A) Back Rest
 (21B) Seat
 (22) Personal Back Rest and Seat Cooling and Heating Unit (PCHU)

Figures 2A, 2B, 2C:
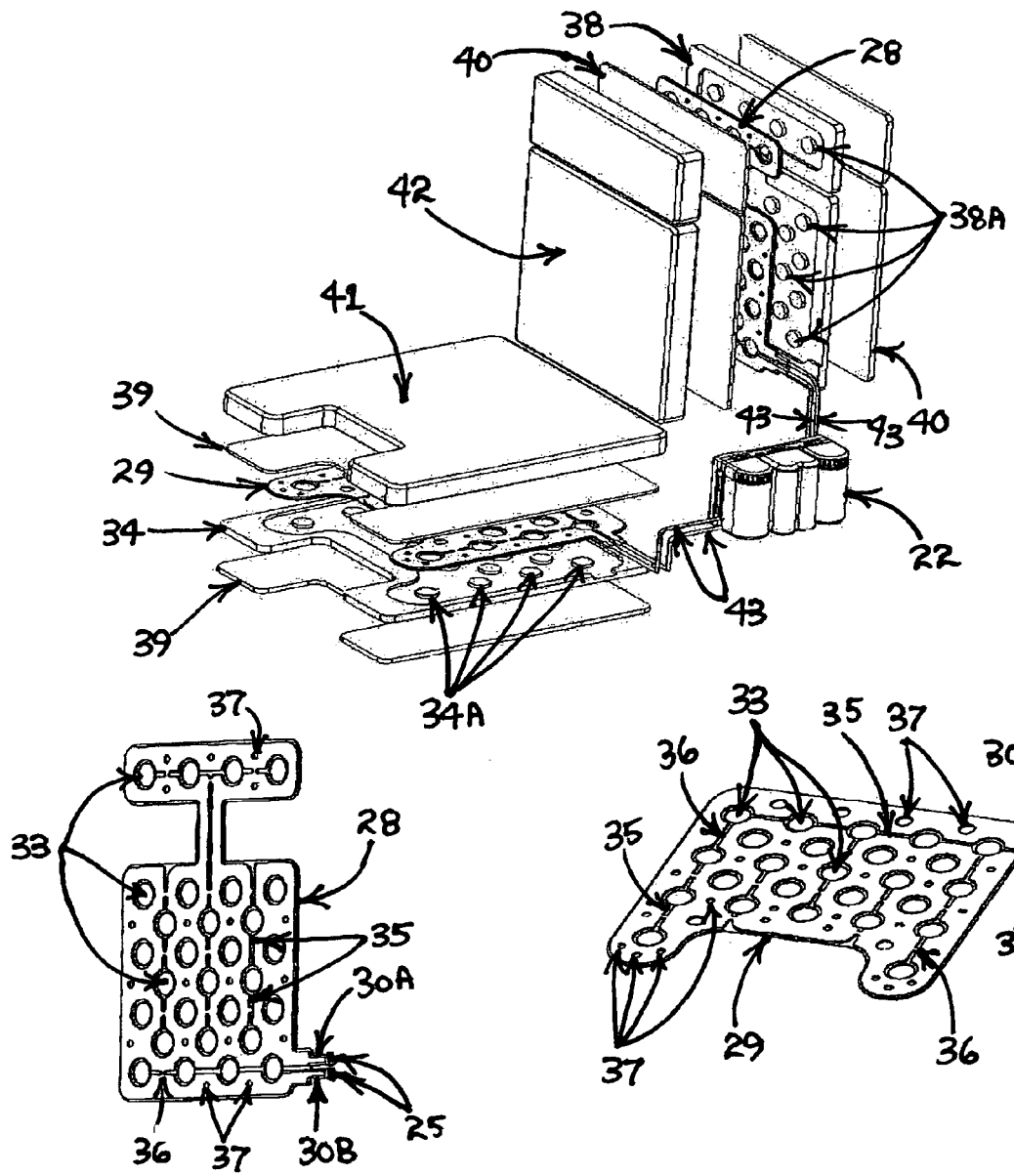
FIG. 2A is an exploded perspective view of the back rest and seat assemblies of the invention connected to the personal cooling and heating unit.
FIG. 2B is a perspective view of the back rest cooling/heating liquid bladder.
FIG. 2C is a perspective view of the seat cooling/heating liquid bladder.

(23) Cooling Loop Pump
(23A) Mattress
(23B) Back Rest and Seat Loop Pump
(24) Temperature Selector
(25) Quick Release Hose and Fittings
(26) Air Heat Exchanger Cooling Liquid Channel
(27) Air Heat Exchanger-Air Channel
(28) Back Rest Liquid Bladder
(29) Seat Liquid Bladder
(30A) Liquid Input Tube
(30B) Liquid Output Tube
(31) Cooling Fin
(32) Liquid Pack
(33) Support Hole
(34) Seat Support Pillar Assembly
(34A) Seat Support Pillar
(35) Flow Block
(36) Flow Block Relief
(37) Diverter and Bladder Expansion Limiter
(38) Back Rest Support Pillar Assembly
(38A) Back Rest Support Pillar
(39) Seat Bladder Support Panel
(40) Back Rest Bladder Support Panel
(41) Seat Cushion
(42) Back Rest Cushion
(43) Bladder Liquid Tubing I. Detailed Description of the Most Preferred Embodiment:

The user connects the Personal Cooling and Heating Unit (PCHU) (22) and the Battery Power Supply (20) by plugging the Quick Release Hose and Fittings (25) from the Back Rest (21A) and the Seat (21B) into the Personal Cooling and Heating Unit (PCHU) (22) as depicted in FIGS. 2A, 2B & 2C.

Figure 5:
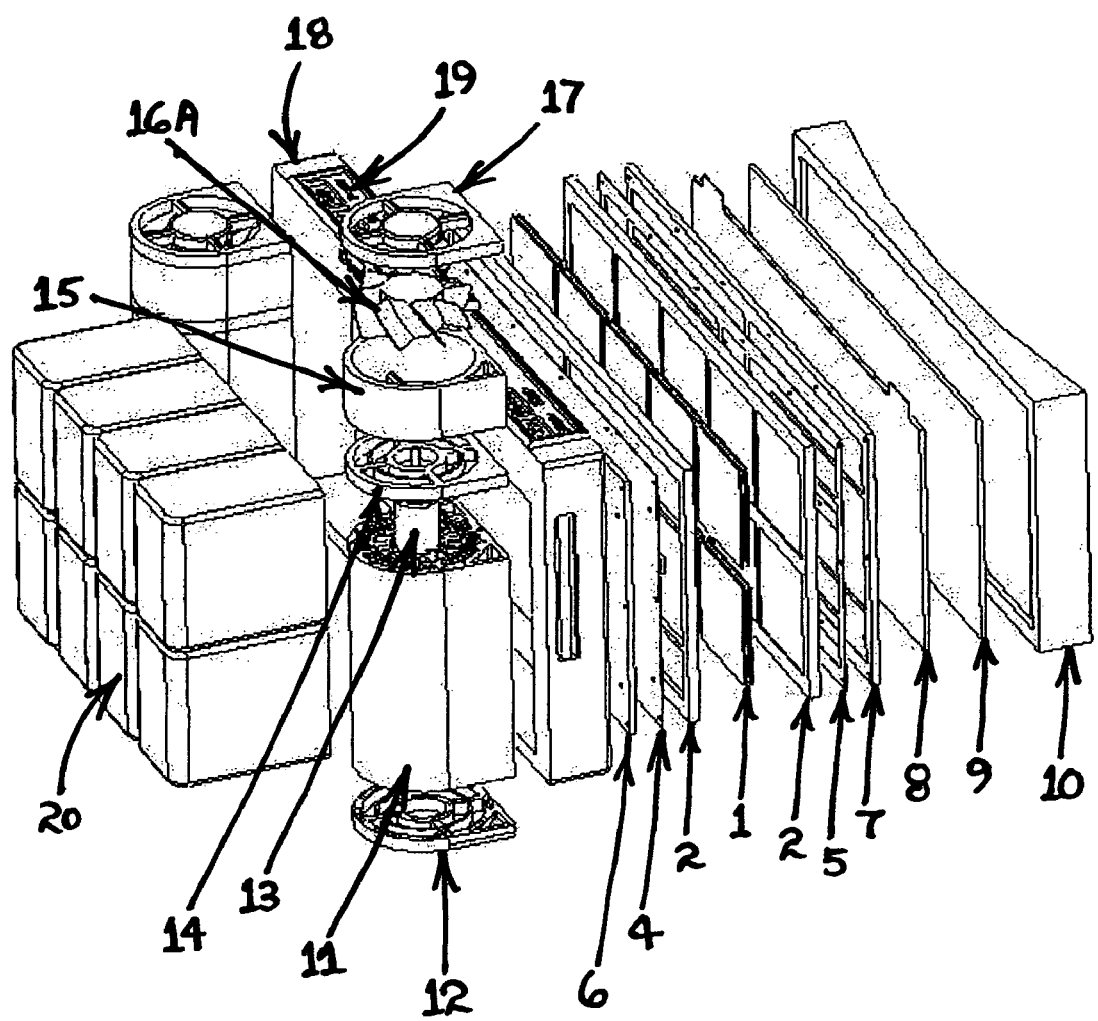
FIG. 5 is an exploded perspective view of the personal cooling and heating unit of the embodiment depicted in FIG. 1 and FIG. 2.

Cooling or heating is started by activating the power switch of the Micro Controller, Display and Keypad (19) on the Personal Cooling and Heating Unit (PCHU) (22) as depicted in FIGS. 1 and 5. The user can adjust the cooling or heating rate by a wireless or wired remote control.

For cooling, the Micro Controller, Display and Keypad (19) checks the capacity of the Battery Power Supply (20) and begins to monitor the system's Temperature Sensors (3). While monitoring the Temperature Sensors (3), the Micro Controller, Display and Keypad (19) automatically makes adjustments to the speed of the Air Heat Exchanger (11) Air Heat Exchanger Fan (16), the flow rate of the Cooling Loop Pump (23) and the temperature of the Reversible Thermoelectric Cooler (TEC) Modules (1) to meet the user's cooling and/or heating requirements with the most power-efficient settings.

The Micro Controller, Display and Keypad (19) powers up the Reversible Thermoelectric Cooler (TEC) Modules (1) and continually monitors the power supply drain and capacity. The Reversible Thermoelectric Cooler (TEC) Modules (1) provide cooling or heating (per the user's selection) by changing the temperature of the liquid flowing through the Back Rest (21A) and the Seat (21B).

The Back Rest and Seat Loop Pumps (23B) circulate a water-based cooling liquid through the Back Rest (21A) and the Seat (21B) and Back Rest and Seat Loop Liquid Heat Exchanger (2A) and the Cooling Loop Pumps (23) in a separate isolated loop pump cooling liquid through the Air Heat Exchangers (11) until the user selected cooling is achieved.

The Air Heat Exchangers' (11) Air Heat Exchanger Fans (16) are powered up as required to provide heat transfer from the Air Heat Exchanger (11) to the ambient air or through an exhaust duct not depicted.

For heating, a flexible Electric Heating Strip (8) is attached to the Back Rest and Seat Loop Liquid Heat Exchanger (2A) by means of the Cold Side Silicon Sealing Gasket (5) and the Cold Side Liquid Heat Exchanger and Heater Transfer Plate Back Plate (7). The flexible Electric Heating Strip (8) heats liquid in the Back Rest and Seat Loop Heat Exchanger (2A) and the Back Rest and Seat Loop Pump (23B) circulates the heated liquid through the Quick Release Hose and Fittings (25) to and through the Back Rest (21A) and the Seat (21B).

The Battery Power Supply (20) can be exchanged or recharged after two or more hours of operation depending upon user settings and concomitant energy demands.

Description of Components of the Personal Back Rest and Seat Cooling and Heating System of the Most Preferred Embodiment The Personal Cooling and Heating System has four main components:

1) Cooling Unit (CU):

In the Preferred Embodiment as depicted in FIGS. 1,2,4, 5,6,7 and 8 the Cooling Unit (CU) is comprised of nine Reversible Thermoelectric Cooler (TEC) Modules (1) attached to a Liquid Heat Exchanger Frame (2) to form a Back Rest and Seat Loop Liquid Heat Exchanger (2A) such that the cold side of the nine Reversible Thermoelectric Cooler (TEC) Modules (1) form the side of the Back Rest and Seat Loop Liquid Heat Exchanger (2A) and the nine Reversible Thermoelectric Cooler (TEC) Modules (1) are also attached to a Liquid Heat Exchanger Frame (2) to form a Cooling Loop Liquid Heat Exchanger (2B) such that the hot side of the nine Reversible Thermoelectric Cooler (TEC) Modules (1) form the side of the Cooling Loop Liquid Heat Exchanger (2B); two Cooling Loop Pumps (23) capable of pumping a cooling fluid from the Cooling Loop Liquid Heat Exchanger (2B) to two Air Heat Exchangers (11); the two Air Heat Exchangers (11) each having attached its own Air Heat Exchanger Fans (16), each of which Air Heat Exchanger Fans (16) is comprised of an Air Heat Exchanger Fan Impeller (16A) a Brushless Fan Motor (13) which are housed in a Fan Impeller Housing (15), an Air Heat Exchanger Fan End Cap (14) and a Fan Housing Cap (17); a Micro Controller, Display and Keypad (19) electrically and/or electronically connected to: 17 internal Temperature Sensors (3) in the Back Rest (21A) and the Seat (21B); the two Air Heat Exchanger Fans (16); the Cooling Loop Liquid Heat Exchanger (2B); and the two Cooling Loop Pumps (23).

Figure 7:
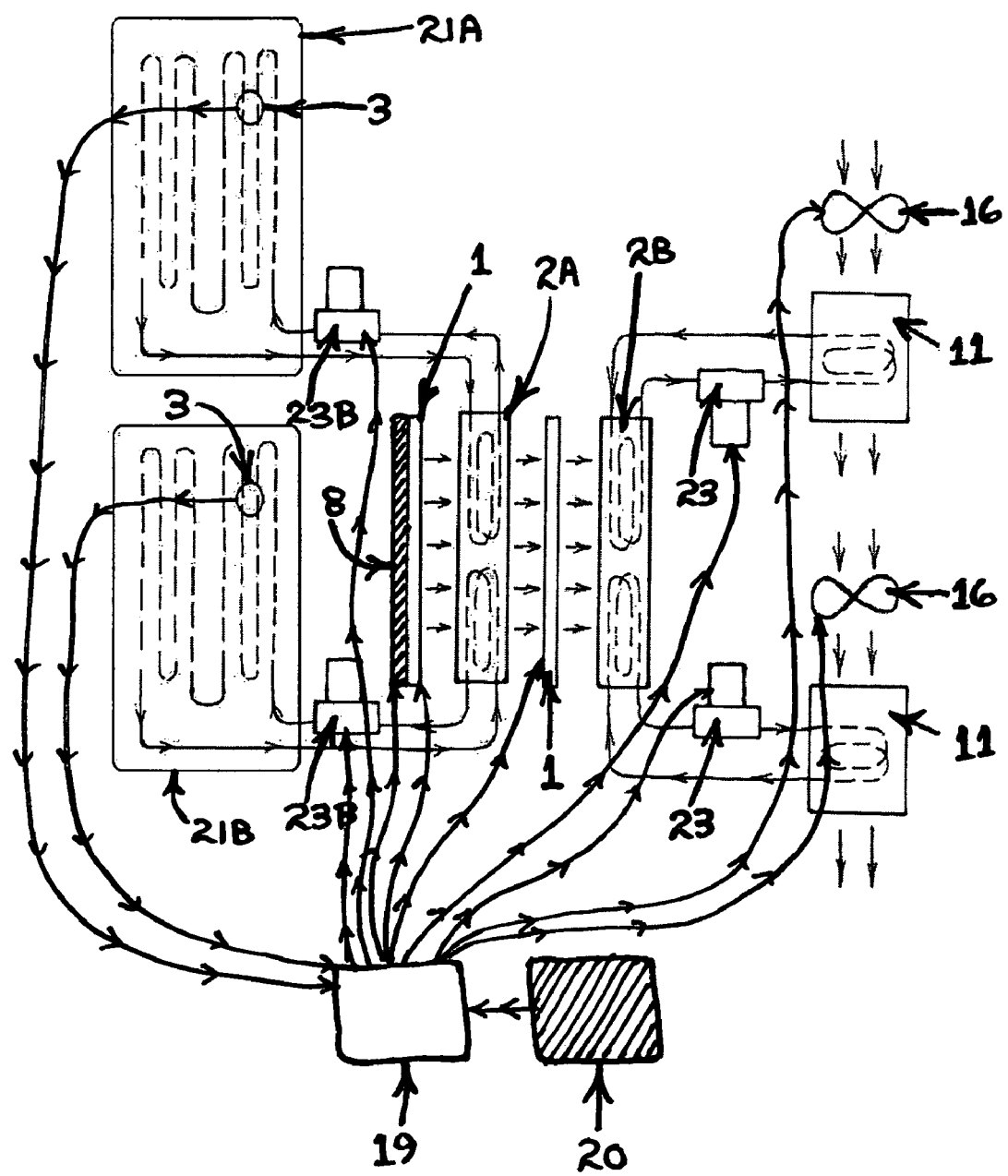
FIG. 7 is a flow sheet depicting the elements and functioning of the personal back rest and seat cooling and heating unit, back rest and seat of the invention generally depicted in FIGS. 1,2 and 5.
Figure 8:
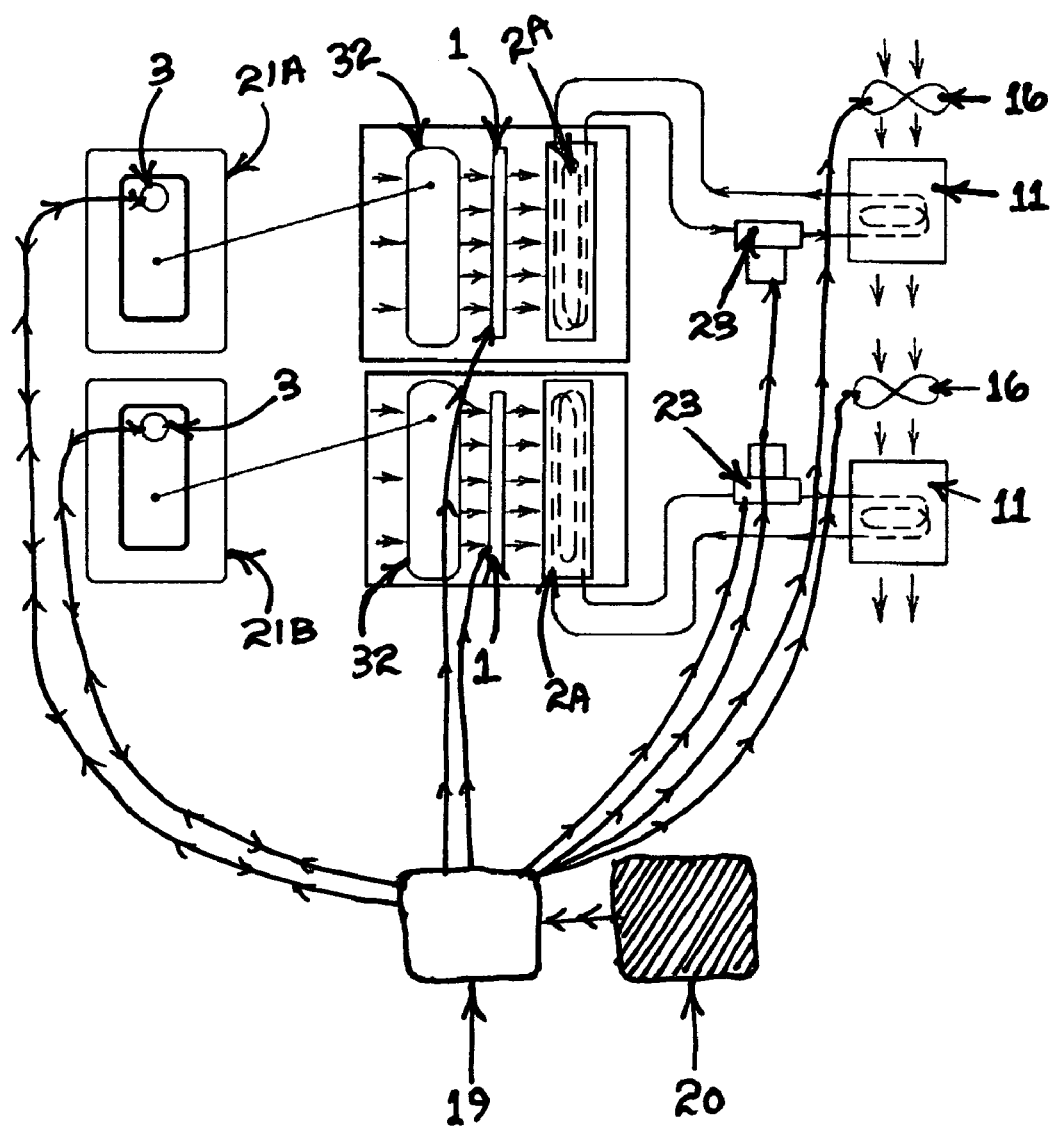
FIG. 8 is a flow sheet depicting the elements and functioning of the back rest and seat mounted heat exchanger embodiment of the personal back rest and seat cooling and heating unit, back rest and seat of the invention.
Figure 9:
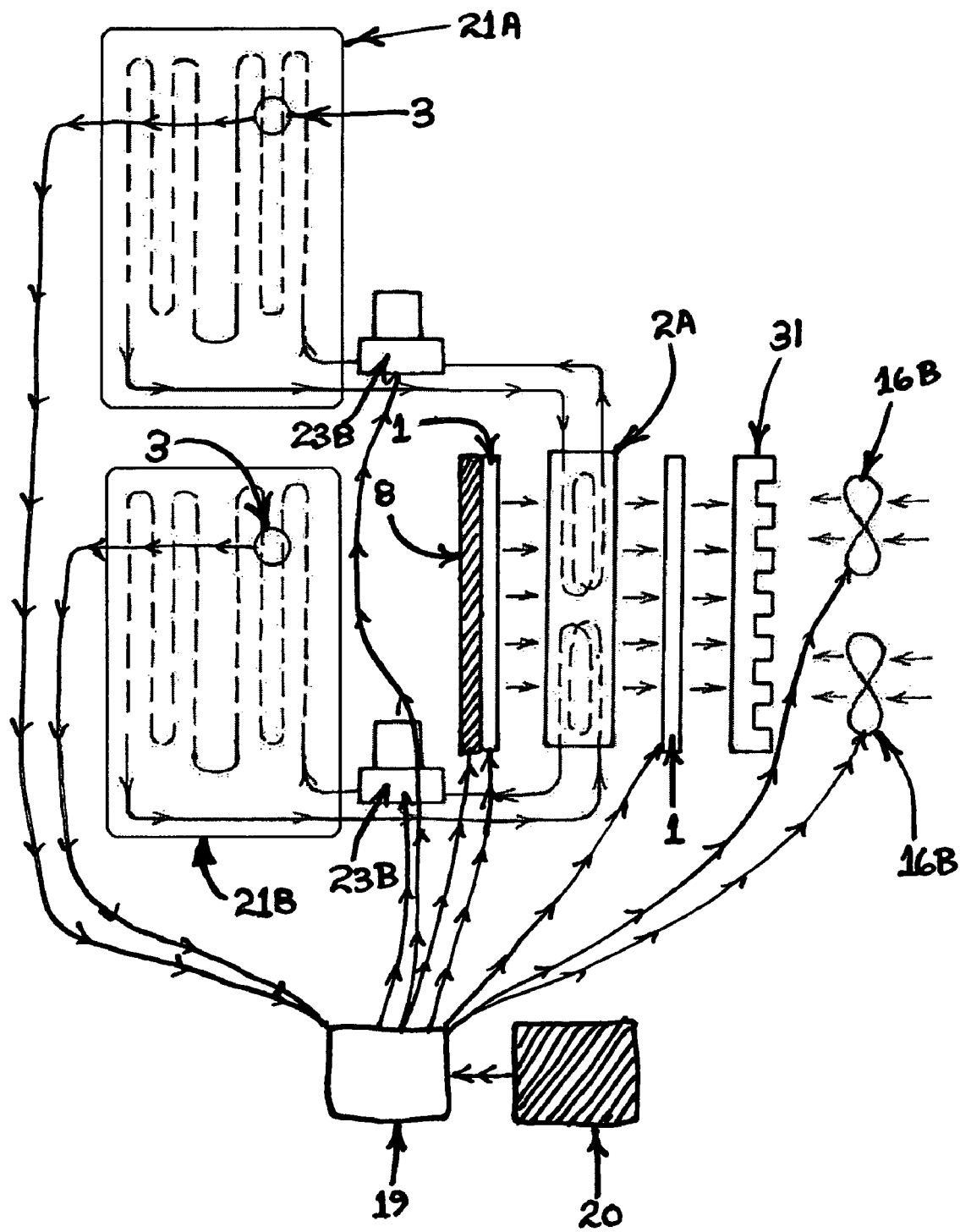
FIG. 9 is a flow sheet depicting the elements and functioning of the cooling fin embodiment of the personal back rest and seat cooling and heating unit, back rest and seat of the invention.

2) Heating Unit (HU):

In the Preferred Embodiment as depicted in FIGS. 5,7 and 9 the Heating Unit uses the following components of the Cooling Unit: the Back Rest and Seat Loop Liquid Heat Exchanger (2A) which is attached to a flexible Electric Heating Strip (8); one Back Rest and Seat Loop Pump (23B), and the Micro Controller, Display and Keypad (19) electrically and/or electronically connected to: 17 internal Temperature Sensors (3) in the Back Rest (21A) and the Seat (21B); the Back Rest and Seat Loop Pump (23B). The flexible Electric Heating Strip (8) heats the Back Rest and Seat Loop Liquid Heat Exchanger (2A) and the Back Rest and Seat Loop Pump (23B) circulates the heated liquid up through the Back Rest (21A) and the Seat (21B). The flexible Electric Heating Strip (8) will evenly distribute heat over the Back Rest and Seat Loop Liquid Heat Exchanger (23B) to provide the optimal heat transfer to the user.

3) Power Supply (PS) (20):

In the Preferred Embodiment as depicted in FIGS. 1,2,5, 7,8 and 9 the Battery Power Supply (20) for both the Cooling and Heating Units are generally off-the-shelf, rechargeable Lithium Ion batteries. The Cooling Unit Power Supply weighs only four pounds and the Heating Unit Power Supply weighs an additional 3 pounds to heat 700 BTU for 2 full hours. The system design will determine whether the batteries packs are mounted on the main unit or as separate packs.

Figure 6A:
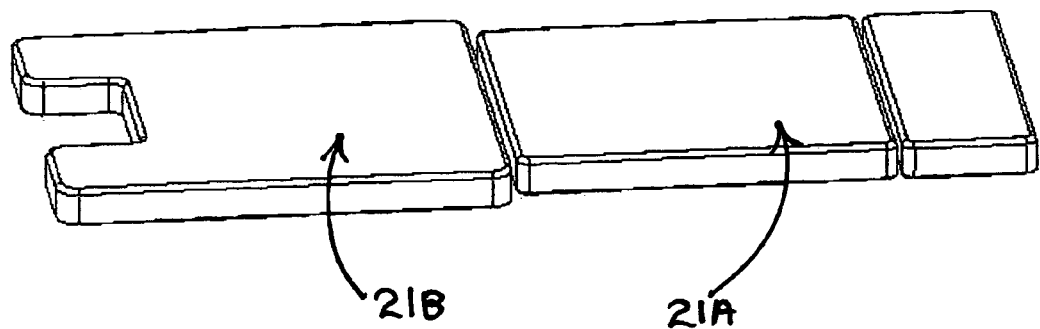
FIG. 6A is a perspective view of the back rest and seat assemblies configured as a mattress or sleeping surface.
Figure 6B:
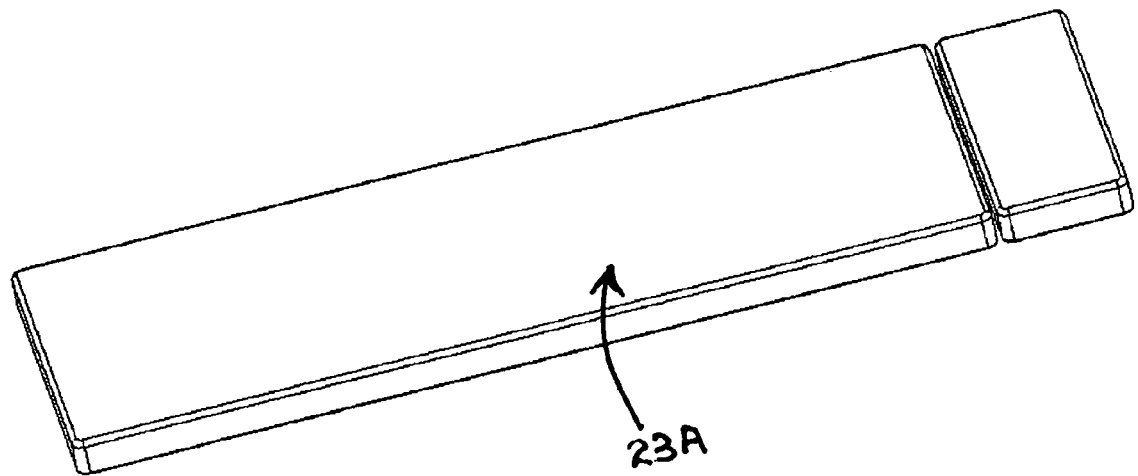
FIG. 6B is a perspective view of the mattress embodiment of the current invention.

4) Back Rest (21A) and the Seat (21B):

In the Preferred Embodiment as depicted in FIGS. 2,6,7 and 9 the system will be used with a Back Rest (21A) and the Seat (21B) that is convertible to a sleeping surface as depicted in FIG. 6A or as a Mattress (23A) depicted in FIG. 6B. The Back Rest (21A) and the Seat (21B) containing a tubing or channel through which a cooling/heating liquid can flow. The Back Rest (21A) and the Seat (21B) are fitted with Quick Release Hose and Fittings (25) to allow the user to remove the Cooling Unit and Heating Unit without having to remove the Back Rest (21A) and the Seat (21B). The Cooling Unit circulates a water-based heat exchange liquid in the Bladder Liquid Tubing (43) through the Liquid Input Tube (30A) within the Back Rest (21A) and the Seat (21B). Liquid warmed by the user's body exits the Back Rest (21A) and the Seat (21B) by being pumped through the Liquid Output Tube (30B) through the Bladder Liquid Tubing (43) and then into the Back Rest and Seat Loop Liquid Heat Exchanger (2A) by the Back Rest and Seat Loop Pump (23B). Channels within the Liquid Heat Exchanger Frame (2) conduct the warmed liquid such that it comes in contact with the nine Reversible Thermoelectric Cooler (TEC) Modules (1) thus transferring the heat from the liquid to the cold side of the nine Reversible Thermoelectric Cooler (TEC) Modules (1) that form the side of the Back Rest and Seat Loop Liquid Heat Exchanger (2A). The heat is transferred from the liquid directly to the cold sides of the nine Reversible Thermoelectric Cooler (TEC) Modules (1). Peletier junctions within the nine Reversible Thermoelectric Cooler (TEC) Modules (1) transfer the heat from the cold sides of the Reversible Thermoelectric Cooler (TEC) Modules (1) to the hot sides of the Reversible Thermoelectric Cooler (TEC) Modules (1). Heat from the hot sides of the Reversible Thermoelectric Cooler (TEC) Modules (1) is transferred to the Cooling Loop Liquid Heat Exchanger (2B). The Cooling Loop Liquid Heat Exchanger (2B) transfers the heat to the cooling liquid as it circulates through the Cooling Loop Liquid Heat Exchanger (2B). Air Heat Exchangers (11) are located on either side of the Cooling Loop Liquid Heat Exchanger (2B). The cooling liquid carries the heat to the two Air Heat Exchangers (11) and transfers the heat to the Air Heat Exchanger (11) as it circulates through the Air Heat Exchanger Cooling Liquid Channel (26). An Air Heat Exchanger Fan (16) located on the top of each of the Air Heat Exchangers (11) blows ambient air through the Air Heat Exchanger Air Channel (27) providing forced convection cooling of the Air Heat Exchanger (11). The heat is transferred to the ambient air and exits out of the bottom of the Air Heat Exchanger (11). The cold sides of the Reversible Thermoelectric Cooler (TEC) Modules (1) maintain the liquid-in the Back Rest (21A) and the Seat (21B) at the cooling temperature desired by the user as set by the user on the Micro Controller, Display and Keypad (19).

The Back Rest (21A) assembly is comprised of a Back Rest Cushion (42) that is designed for comfort as the contact portion with the user. Also the Back Rest (21A) is further comprised of a Back Rest Liquid Bladder (28) which takes the pumped liquid through the Liquid Input Tube (30A) and channels it through the bladder by a series of Flow Blocks (35). The Back Rest Liquid Bladder (28) is maintained in its general shape and allows the fluid to flow through it by a series of Diverter and Bladder Expansion Limiters (37) and in the event that the unit is pinched by a user the flow of liquid is assured by one or more of the rigidly maintained Flow Block Reliefs (36) that are interspersed throughout the Back Rest Liquid Bladder (28). The integrity of the Back Rest Liquid Bladder (28) is further maintained by the Back Rest Pillar Support Assembly (38), the Back Rest Support Pillars (38A) of which protrude through the Support Holes (33) of the Back Rest Liquid Bladder (28) each of which are then sandwiched between two Back Rest Bladder Support Panels (40).

The Seat (21B) assembly is comprised of a Seat Cushion (41) that is designed for comfort as the contact portion with the user. Also the Seat (21B) is further comprised of a Seat Liquid Bladder (29) which takes the pumped liquid through the Liquid Input Tube (30A) and channels it through the bladder by a series of Flow Blocks (35). The Seat Liquid Bladder (29) is maintained in its general shape and allows the fluid to flow through it by a series of Diverter and Bladder Expansion Limiters (37) and in the event that the unit is pinched by a user the flow of liquid is assured by one or more of the rigidly maintained Flow Block Reliefs (36) that are interspersed throughout the Seat Liquid Bladder (29). The integrity of the Seat Liquid Bladder (29) is further maintained by the Seat Pillar Support Assembly (34), the Seat Support Pillars (34A) of which protrude through the Support Holes (33) of the Seat Liquid Bladder (29) each of which are then sandwiched between two Seat Bladder Support Panels (39).

The individual components of the device as depicted in the drawings are comprised and function as follows:

1. Reversible Thermoelectric Cooler (TEC) Modules (1)

Reversible Thermoelectric Cooler (TEC) Modules (1), also known as Pelitier devices, are small devices that act as heat pumps. The Reversible Thermoelectric Cooler (TEC) Modules (1) are usually composed of small Bismuth Telluride cubes sandwiched between two ceramic plates. When a DC current is applied to the module, heat is moved from one side of the TEC module Reversible Thermoelectric Cooler (TEC) Modules (1) to the other. To create greater efficiencies and reduce the size and weight of the Personal Cooling and Heating Unit (PCHU) (22), when the Micro Controller, Display and Keypad (19) activates the Cooling Unit the cold side of the nine Reversible Thermoelectric Cooler (TEC) Modules (1) forms the side of the Back Rest and Seat Loop Liquid Heat Exchanger (2A) and the hot side of the same nine Reversible Thermoelectric Cooler (TEC) Modules (1) forms the side of the Cooling Loop Liquid Heat Exchanger (2B). For maximum efficiency the Reversible Thermoelectric Cooler (TEC) Modules (1) are activated by a reversible direct current that is pulsed from the Micro Controller, Display and Keypad (19), the power for which is supplied by the Battery Power Supply (20).

2. Back Rest and Seat Loop Liquid Heat Exchanger (2A) and Cooling Loop Liquid Heat Exchanger (2B)

In the Preferred Embodiment the Back Rest and Seat Loop Liquid Heat Exchanger (2A) and Cooling Loop Liquid Heat Exchanger (2B) are each comprised of a Liquid Heat Exchanger Frame (2) and nine Reversible Thermoelectric Cooler (TEC) Modules (1) forming the sides of the Cooling Loop Liquid Heat Exchanger (2B) and the Back Rest and Seat Loop Liquid Heat Exchanger (2A). For cooling, warmed liquid exiting the Back Rest (21A) and the Seat (21B) is circulated through the Back Rest and Seat Loop Liquid Heat Exchanger (2A) and cooled by coming in direct contact with the cold side of the nine Reversible Thermoelectric Cooler (TEC) Modules (1). For heating, cool liquid exiting the Back Rest (21A) and the Seat (21B) is circulated through the Back Rest and Seat Loop Liquid Heat Exchanger (2A) and heated by coming in direct contact with the hot side of the nine Reversible Thermoelectric Cooler (TEC) Modules (1). The Liquid Heat Exchanger Frame (2) will be initially fabricated out of plastic, but may be constructed of any suitable material. The Liquid Heat Exchanger Frame (2) may be divided into two separate channels from which the two Cooling Loop Pumps (23) draw and ultimately return the cooling liquid the respective separate channels. This design provides a more effective heat transfer rate from the liquid to the Liquid Heat Exchanger (2).

3. Back Rest and Seat Loop Pump (23B) and Cooling Loop Pumps (23)

Figure 4:
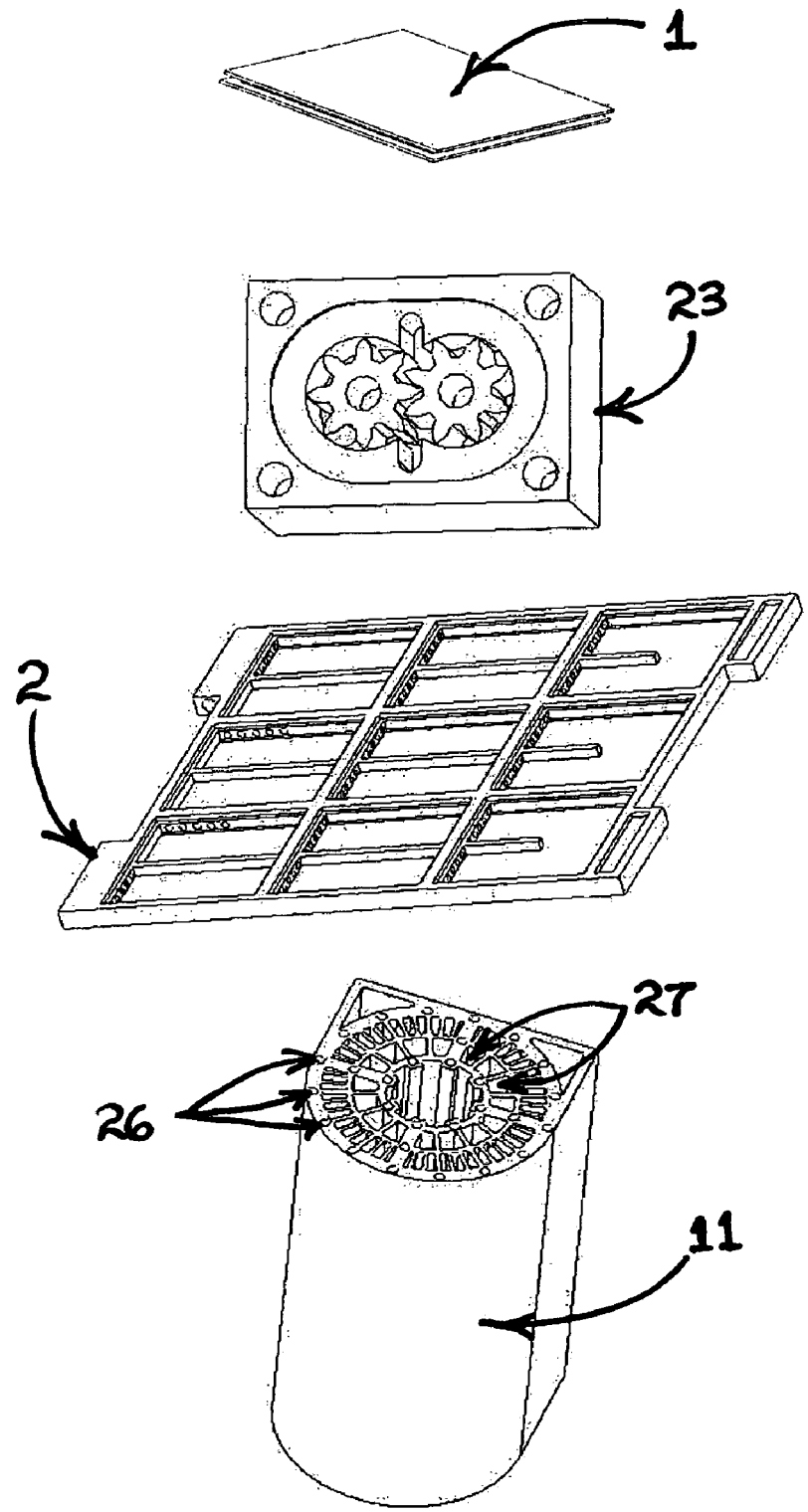
FIG. 4 is a perspective view of the Circulating Pump, the Liquid Heat Exchanger, the Thermoelectric Cooler (TEC) Modules, and the Air Heat Exchanger.

A Back Rest and Seat Loop Pump (23) circulates liquid through the Back Rest and Seat Loop Liquid Heat Exchanger (2A) and the Back Rest (21A) and the Seat (21B) in one closed circuit and in another closed circuit the Cooling Loop-Pump (23) circulates liquid through the Cooling Loop Liquid Heat Exchanger (2B) and the Air Heat Exchanger Cooling Liquid Channels (26) in the two Air Heat Exchangers (11). The Back Rest and Seat Loop Pump (23B) and the Cooling Loop Pumps (23) are designed to have two gears as depicted in FIG. 4. A variable speed, brushless DC motor will power one gear that drives the other gear, providing precise management of the circulation of the cooling/heating liquid.

4. Air Heat Exchanger (11)

The Air Heat Exchangers (11) are attached opposite sides of the Personal Cooling and Heating Unit (PCHU) (22) containing the nine Reversible Thermoelectric Cooler (TEC) Modules (1), the Back Rest and Seat Loop Liquid Heat Exchanger (2A) and the Cooling Loop Liquid Heat Exchanger (2B). Each Air Heat Exchanger (11) is cylinder-shaped and has formed within it are several Air Heat Exchanger Cooling Liquid Channels (26) and several Air Heat Exchanger Air Channels (27). The Air Heat Exchanger Cooling Liquid Channels (26) are comprised of a series of round holes around the perimeter of the top of the Air Heat Exchangers (11) that run vertically to the bottom of the Air Heat Exchangers (11). When used as a cooling device the liquid when warmed by the user's body is pumped from the Back Rest and Seat through the Back Rest and Seat Loop Liquid Heat Exchanger (2A). As the liquid travels through the Back Rest and Seat Loop Liquid Heat Exchanger (2A) it is cooled. The Reversible Thermoelectric Cooler (TEC) Modules (1) provide cooling to the Back Rest and Seat Loop Liquid Heat Exchanger (2A). The Cooling Loop Liquid Heat Exchanger (2B) removes heat from the Reversible Thermoelectric Cooler (TEC) Modules (1). The Air Heat Exchangers (11) takes the heat from the Cooling Loop Liquid Heat Exchanger (2B). When two Air Heat Exchangers are used, each Air Heat Exchanger (11) takes half of the heat from its corresponding side of the Cooling Loop Liquid Heat Exchanger (2B) which is comprised of a divided two separate channel Liquid Heat Exchanger (2) and the nine Reversible Thermoelectric Cooler (TEC) Modules (1). Liquid from one separate channel of the Cooling Loop Liquid Heat Exchanger (2B) is pumped by one Cooling Loop Pump (23) down through Air Heat Exchanger Cooling Liquid Channels (26) of one of the Air Heat Exchanger (11) in a closed loop. The liquid travels down the Air Heat Exchanger Cooling Liquid Channels (26) through the length of the canister of the Air Heat Exchanger (11) and then back up and down around the interior of the canister of the Air Heat Exchanger (11). The liquid then exits out of the bottom of the canister of the Air Heat Exchanger (11) and back into the Cooling Loop Liquid Heat Exchanger (2B). Similarly, liquid from the other separate chamber of the Cooling Loop Liquid Heat Exchanger (2B) is pumped by a second Cooling Loop Pump (23) down through the opposite Air Heat Exchanger's (11) Air Heat Exchanger Cooling Liquid Channels (26) located in the top of the opposite Air Heat Exchanger (11) in a closed loop. The liquid travels down the the opposite Air Heat Exchanger's (11) Air Heat Exchanger Cooling Liquid Channels (26) through the length of the canister of the opposite Air Heat Exchanger (11) and then back up and down around the interior of the canister of the opposite Air Heat Exchanger (11). The liquid then exits out of the bottom of the canister of the opposite Air Heat Exchanger (11) and back into the Cooling Loop Liquid Heat Exchanger (2B).

5. Air Heat Exchanger Fans (16)

The Air Heat Exchanger Fans (16) are variable (0 to 180) CFM fans used to provide forced convection cooling through the Air Heat Exchanger Air Channels (27) of the Air Heat Exchanger (11). The Air Heat Exchanger Fan (16) will be powered by a 16 mm diameter Maxon Brushless Fan Motor (13). In the best mode the Air Heat Exchanger Fans (16) will be fabricated out of high-temperature plastic. The Air Heat Exchanger Fans (16) and Brushless Fan Motors (13) will be installed in the centers of the tops of the Air Heat Exchanger (11).

The Air Heat Exchanger Fans (16) push ambient air through holes comprising the Air Heat Exchanger Air Channels (27) located on the top and through the Air Heat Exchanger (11) canisters. The holes are located inside the perimeter of the round holes comprising the Air Heat Exchanger Cooling Liquid Channels (26) and run vertically from the top through the bottom of the Air Heat Exchanger (11) canister. The Air Heat Exchanger Fans (16) will push air down through the Air Heat Exchangers' (11) Air Heat Exchanger Air Channels (27) and out the bottom of the Air Heat Exchangers' (11) canister, thus creating an efficient airflow and heat removal. While air is flowing through the Air Heat Exchangers (11), heat is being transferred to or from the ambient air.

6. Controller

The Micro Controller, Display and Keypad (19) is mounted to the top of the Back Rest and Seat Loop Liquid Heat Exchanger (2A) and the Cooling Loop Liquid Heat Exchanger (2B). The Micro Controller, Display and Keypad (19) monitors the remaining charge capacity of the Battery Power Supply (20) and take measurements from 17 Temperature Sensors (3) located: 1) in each of the four tubes connecting the Air Heat Exchanger (11) and the Cooling Loop Liquid Heat Exchanger (2B); 2) on the hot and cold sides of the Reversible Thermoelectric Cooler (TEC) Modules (1); 3) in both the Back Rest and Seat Loop Liquid Heat Exchanger (2A) and the Cooling Loop Liquid Heat Exchanger (2B); 4) in both Air Heat Exchangers (11); 5) the Back Rest (21A) and the Seat (21B) and the inlets and outlets of the liquid for the Back Rest and Seat Loop Liquid Heat Exchanger (2A) and the Cooling Loop Liquid Heat Exchanger (2B).

By monitoring these temperatures, the Micro Controller, Display and Keypad (19) will select the configuration of power required for optimal cooling and heating. The Micro Controller, Display and Keypad (19) will read the required heating or cooling level specified by the user with a Temperature Selector (24) and provide that precise amount of cooling or heating. The user will manually set a thermostat to the desired temperature of number of BTUs within the range of 700–1000 BTUs.

The Micro Controller, Display and Keypad (19) will control the Cooling Loop Pump (23), the Back Rest and Seat Loop Pump (23B), the Air Heat Exchanger Fans (16) and Brushless Fan Motors (13), and the temperatures of the Reversible Thermoelectric Cooler (TEC) Modules (1) to provide the most efficient cooling and heating of the liquid that flows through the Back Rest (21A) and the Seat (21B).

Heating

The temperature of the liquid must reach a minimum of 100 degrees F. and preferably 110 degrees F. in order to provide sufficient heating, and the nine Reversible Thermoelectric Cooler (TEC) Modules (1) are not capable of generating this amount of heat alone. The operational components required during heating would be the nine Reversible Thermoelectric Cooler (TEC) Modules (1), the flexible Electric Heating Strip (8) or a fuel burner, one Back Rest and Seat Loop Liquid Heat Exchanger (2A), one Back Rest and Seat Loop Pump (23B), the Micro Controller, Display and Keypad (19) and the Back Rest (21A) and the Seat (21B). The Cooling Unit would be shut off during heating.

It is also possible to use the combustion of a fuel to provide the energy necessary for heating and/or cooling. In most applications this may not be practical. Utilizing the Mattress (23A) embodiment of FIG. 6B in an outdoor, well ventilated area is one such use where the combustion of fuel would be suitable, such as butane, propane, or kerosene, etc.

7. Electric Heating Strip (8)

The flexible Electric Heating Strip (8) is an electric heater that is attached to the cold side of the nine Reversible Thermoelectric Cooler (TEC) Modules (1) comprising a side of the Back Rest and Seat Loop Liquid Heat Exchanger (2A) which in turn is functionally connected to the Back Rest (21A) and the Seat (21B). When the user sets the invention for heat to be delivered to the device the flexible Electric Heating Strip (8) heats the cold side of the nine Reversible Thermoelectric Cooler (TEC) Modules (1) comprising the side of the Back Rest and Seat Loop Liquid Heat Exchanger (2A) which heat is stepped up or increased by the nine Reversible Thermoelectric Cooler (TEC) Modules (1) which in turn heats the liquid that is in contact with the hot side of the nine Reversible Thermoelectric Cooler (TEC) Modules (1) comprising the side of the Back Rest and Seat Loop Liquid Heat Exchanger (2A) and then the Back Rest and Seat Loop Pump (23B) will circulate the heated liquid up through the Back Rest (21A) and the Seat (21B) thus warming a user. The invention may be manufactured such that the area and size of the area of the Back Rest and Seat Loop Liquid Heat Exchanger (2A) that will be heated may be changed, allowing precise regulation of the temperature to the Back Rest (21A) and the Seat (21B) through thermostatic and electronic control.

8. Battery Power Supply

The Battery Power Supply (20) is a battery pack of currently available, rechargeable Lithium Ion batteries that weighs four pounds and supplies 7.2 volts providing at least two hours of continuous operation. The rechargeable battery pack of the Battery Power Supply (20) has a one-hour recharging cycle time. Currently available non-rechargeable batteries and disposable fuel cells can provide either less weight or a longer operating time of up to 6.5 hours of continuous operation. For example, Lithium/Manganese Dioxide 3-volt batteries weigh 0.242 lbs. per cell. For 4 hours of cooling, 10 cells would be used at a total weight of 2.42 lbs. For 6.5 hours of cooling, 16 cells would be used at a total weight of 3.88 lbs. Zinc-Air 5.2 volt fuel cells weigh 1.7 lbs. per cell. For 4 hours of cooling, 14 cells would be used at a total weight of 2.38 lbs. For 6.5 hours of cooling, 22 cells would be used at a total weight of 3.74 lbs. However, neither the Lithium/Manganese Dioxide or fuel cell batteries are rechargeable.

Battery technology keeps on improving and manufacturers of rechargeable batteries, non-rechargeable batteries and fuel cells have publicized that by the end of 2003 they will be offering products that weigh 50 percent less and have two to three times the capacity of their current products which could lead to a 35% reduction in size and weight of this invention.

Figure 3:
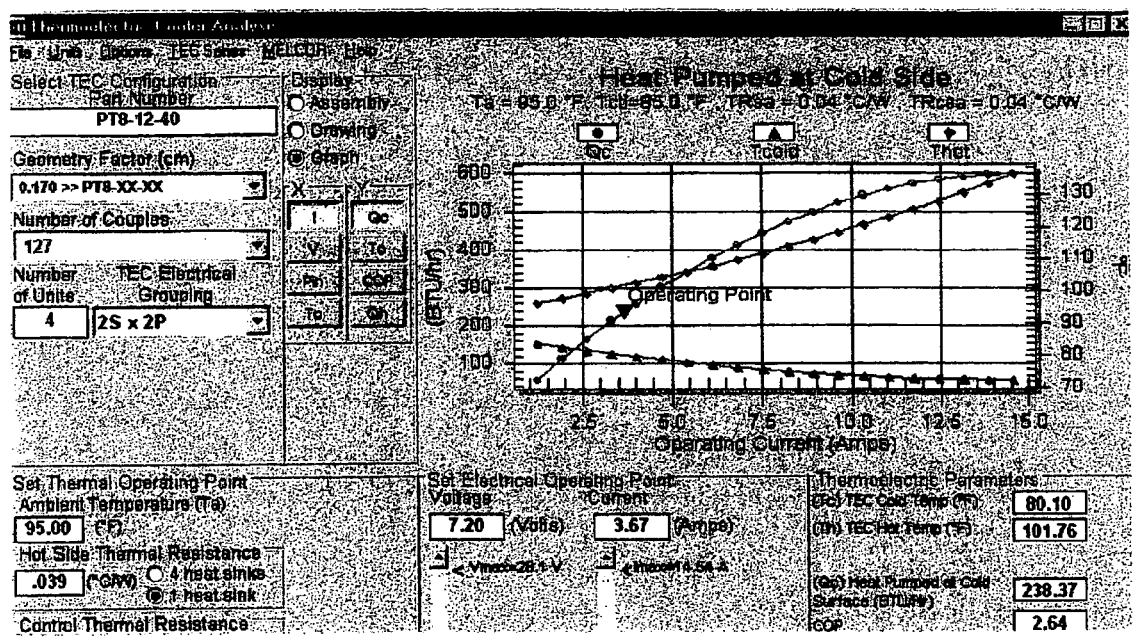
FIG. 3 is a graphical analysis of the Thermoelectric Cooler (TEC) Module depicted in FIG. 4 and FIG. 5.

FIG. 3 graphically illustrates a specific configuration of Reversible Thermoelectric Cooler (TEC) Modules (1) that will provide 125 watts of cooling for 46 watts of input of electrical power. The coefficient of performance for this configuration of Reversible Thermoelectric Cooler (TEC) Modules (1) is 270 percent.

II. Detailed Description of the Air Cooled Cooling Unit Embodiment:

The Air Cooled Cooling Unit Embodiment of the current invention is generally depicted in FIG. 9 and it utilizes all the same components and features of the most preferred embodiment with the exception that: the Cooling Loop Liquid Heat Exchanger (2B); the two Cooling Loop Pumps (23); and the two Air Heat Exchanger Assemblies (11,12, 13,14,15,16,16A and 17); are all replaced with a Cooling Fin (31) attached to the hot side of the nine Reversible Thermoelectric Cooler (TEC) Modules (1) that form a side of the Back Rest and Seat Loop Liquid Heat Exchanger (2A) when the Temperature Sensor (3) in communication with the Micro Controller, Display and Keypad (19) indicates that the Back Rest (21A) and the Seat (21B) requires cooling. A Cooling Fin Fan (16B) then blows ambient air across the Cooling Fin (31) thus cooling the Cooling Fin (31) which in turn cools the liquid flowing into the Back Rest (21A) and the Seat (21B) thereby cooling the user.

The Heating Unit of the Air Cooled Cooling Unit Embodiment of the current invention is generally depicted in FIG. 9 and it utilizes all the same components and features of the most preferred embodiment without exception.

III. Detailed Description of the Mattress Embodiment:

As depicted in FIGS. 6A & 6B, this invention may also be used as a sleeping surface. This is easily accomplished by laying end to end the Back Rest (21A) and the Seat (21B) which provides a sleeping surface that can be temperature controlled as described in the above embodiments. In yet another embodiment the invention can be made as a Mattress (23A) utilizing all the internal and external features of the other embodiments described above. Having one or more Temperature Sensors (3) and automatic temperature control provides maximum comfort for a user as they sleep, especially in outdoor environments where nighttime ambient temperatures can vary widely.

While my above descriptions of the invention, its parts, and operations contains many specificities, these should not be construed as limitations on the scope of the invention, but rather as exemplifications of present embodiments thereof. Many other variations are possible, for example, other embodiments, shapes, and sizes of the device can be constructed to fit a user's needs or environment and work with a unit designed to work by the principles of the present invention; various materials, pumps, colors and configurations can be employed in the unit's design that would provide interesting embodiment differences to users including such practical designs as would, for instance conceal the unit.

Accordingly, the scope of the invention should be determined not by the embodiments illustrated, but by the claims and their legal equivalents as filed herewith.

Having described my invention, I claim:

1. A personal back rest and seat cooling and heating system comprised of:
    a back rest;
    a seat;
    at least one temperature sensor;
    a temperature transfer medium contained by the back rest and the seat;
    a cooling unit;
    a heating unit;
    a temperature transfer medium transport means;
    the temperature transfer medium transport means being capable of transporting the temperature transfer medium from the back rest and/or the seat into the cooling unit where the temperature transfer medium may be cooled by one or more cooling means and then once cooled the temperature transfer medium is transported back to the back rest and the seat by the temperature transfer medium transport means;
    the temperature transfer medium transport means being capable of transporting the temperature transfer medium from the back rest and/or the seat into the heating unit where the temperature transfer medium may be heated by one or more heating means and then once heated the temperature transfer medium is transported back to the back rest and/or the seat by the temperature transfer medium transport means;
    the cooling means being comprised of:
    at least one reversible thermoelectric cooler module electrically attached to and activated by a reversible direct current of electricity that is pulsed from a user adjustable electronic controller in one direction when the temperature sensor communicates to the user adjustable electronic controller that the temperature of the back rest and/or the seat is higher than a user selected temperature and in the event that the temperature sensor communicates to the user adjustable electronic controller that the temperature of the back rest and/or the seat is lower than the user selected temperature the user adjustable electronic controller automatically reverses the direction of the reversible direct current of electricity that is pulsed from the user adjustable electronic controller;
    the reversible thermoelectric cooler module having an electrically reversible hot side and an electrically reversible cold side which is reversed by the user adjustable electronic controller reversing the direction of the pulsed reversible direct current such that the electrically reversible hot side becomes the electrically reversible cold side and the electrically reversible cold side becomes the electrically reversible hot side;
    at least one back rest and seat loop liquid heat exchanger attached to the temperature transfer medium transport means wherein when the temperature transfer medium transport means is activated the temperature transfer medium is pumped from the back rest and/or the seat through the back rest and seat loop liquid heat exchanger and back to the back rest and/or the seat;
    the back rest and seat loop liquid heat exchanger having a front side and a back side either or both of which is formed by the electrically reversible cold side of the reversible thermoelectric cooler module such that the temperature transfer medium makes direct contact with the electrically reversible cold side of the reversible thermoelectric cooler module when pumped through the back rest and seat loop liquid heat exchanger when the temperature sensor communicates to the user adjustable electronic controller that the temperature of the back rest and/or the seat is higher than the user selected temperature and in the event that the temperature sensor communicates to the user adjustable electronic controller that the temperature of the back rest and/or the seat is lower than the user selected temperature the user adjustable electronic controller automatically reverses the direction of the reversible direct current of electricity that is pulsed from the user adjustable electronic controller such that the electrically reversible cold side of the reversible thermoelectric cooler module becomes the electrically reversible hot side of the reversible thermoelectric cooler module which remains in direct contact with the temperature transfer medium;
    at least one air heat exchanger;
    the air heat exchanger having at least one cooling liquid channel therein;
    a cooling liquid contained in the air heat exchanger cooling liquid channel;
    the air heat exchanger having at least one air channel there through;
    at least one air heat exchanger fan attached to the air heat exchanger;
    at least one cooling loop liquid heat exchanger;
    at least one cooling loop pump means capable of pumping the cooling liquid from the cooling loop liquid heat exchanger to through the air heat exchanger cooling liquid channel and then back to the cooling loop liquid heat exchanger;
    the cooling loop pump means being electrically attached to and activated by the user adjustable electronic controller when the temperature sensor communicates to the user adjustable electronic controller that the temperature of the back rest and/or the seat is higher than the user selected temperature;
    the cooling loop liquid heat exchanger having a cooling front side and a cooling back side either or both of which are formed by the electrically reversible hot side of the reversible thermoelectric cooler module, the electrically reversible cold side of which is used to form either or both of the front side or the back side of the back rest and seat loop liquid heat exchanger, such that the cooling liquid makes direct contact with the electrically reversible hot side of the reversible thermoelectric cooler module when pumped through the cooling loop liquid heat exchanger when the temperature sensor communicates to the user adjustable electronic that the temperature of the back rest and/or the seat is higher than the user selected temperature; and the air heat exchanger fan being electrically attached to and activated by the user adjustable electronic controller when the temperature sensor communicates to the user adjustable electronic controller that the temperature of the back rest and/or the seat is higher than the user selected temperature by electrically activating the air heat exchanger fan which blows ambient air through the air channel of the air heat exchanger that has been heated by the circulating of the cooling liquid therein and then discharging the now heated blown ambient air into the surrounding ambient air;

the heating means being comprised of;

at least one electric heating strip attached to the electrically reversible cold side of the reversible thermoelectric cooler module which is the electrically reversible cold side when the temperature sensor communicates to the user adjustable electronic controller that the temperature of the vest is lower than the user selected temperature;

a user adjustable electronic controller electrically attached to the temperature transfer medium transport means, the cooling means and the heating means;

the user adjustable electronic controller is electronically connected to the temperature sensor wherein the user adjustable electronic controller automatically and electrically activates the temperature transfer medium transport means when the temperature sensor electronically communicates to the user adjustable electronic controller that the back rest and/or the seat is a temperature that is different than that of a user selected temperature setting on the user adjustable electronic controller thus causing the temperature transfer medium to be transported from the back rest and/or the seat;

the user adjustable electronic controller automatically and electrically activates only the cooling means when the temperature senior communicates to the user adjustable electronic controller that the temperature of the back rest and/or the seat is higher then the user selected temperature thus causing the temperature transfer medium that has been transported from the back rest and/or the seat to be cooled by the cooling means before being transported back to the bank rest and/or the seat by the temperature transfer medium transport means;

the user adjustable electronic controller automatically and electrically activates only the heating means when the temperature sensor communicates to the user adjustable electronic controller that the temperature of the back rest and/or the seat is lower than the user selected temperature thus causing the temperature transfer medium that has been transported from the back rest and/or the seat to be heated by the heating means before being transported back to the back rest and/or the seat by the temperature transfer medium transport means; and a power supply means electrically ached to the adjustable electronic controller to provide the electrical power necessary for the adjustable electronic controller in communication with the temperature sensor to activate the temperature transfer medium transport means, and either the cooling means or the heating means.

2. The personal back rest and seat cooling and heating system of claim 1 wherein the temperature transfer medium is water.

3. The personal back rest and seat cooling and heating system of claim 1 wherein the back rest and the seat is further comprised of a flexible channel means capable of circulating therein the temperature transfer medium.

4. The personal back rest and seat cooling and heating system of claim 1 wherein the cooling means is ice.

5. The personal back rest and seat cooling and heating system of claim 1 wherein the cooling means is a refrigerant gas.

6. The personal back rest and seat cooling and heating system of claim 1 wherein the heating means is the combustion of a fuel.

7. The personal back rest and seat cooling and heating system of claim 1 wherein the reversible thermoelectric cooler module is at least one Pelitier device.

8. The personal cooling and heating system of claim 1 wherein the reversible thermoelectric cooler module is comprised of at least one Bismuth Telluride cube sandwiched between two ceramic plates.

9. The personal back rest and seat cooling end heating system of claim 1 wherein the cooling unit, the cooling means, the heating unit, the heating means, the temperature transfer medium transport means and the power supply are attached to a carrier capable of being worn by a user thereby making the personal back rest and seat cooling and heating system portable.

10. The personal back rest and cooling and heating system of claim 1 wherein the temperature transfer medium transport means is functionally connected to the back rest and the seat with a self sealing quick disconnect coupling.

11. The personal cooling and heating system of claim 1 wherein the cooling unit, the cooling means, the heating unit, the heating means, the temperature transfer medium transport means, the power supply and the temperature sensor are all controlled by and in communication with the user adjustable electronic controller by wireless means.

12. The personal cooling and heating system of claim 1 wherein the cooling means is comprised of:

at least one reversible thermoelectric cooler module electrically attached to and activated by a reversible direct current of electricity that is pulsed from the user adjustable electronic controller in one direction when the temperature sensor communicates to the user adjustable electronic controller that the temperature of the back rest and/or the seat is higher than the user selected temperature and in the event that the temperature sensor communicates to the user adjustable electronic controller that the temperature of the back rest and/or the seat is lower than the user selected temperature the user adjustable electronic controller automatically reverses the direction of the reversible direct current of electricity that is pulsed from the user adjustable electronic controller;

the reversible thermoelectric cooler module having an electrically reversible hot side and an electrically reversible cold side which is reversed by the user adjustable electronic controller reversing the direction of the pulsed reversible direct current such that the electrically reversible hot side becomes the electrically reversible cold side and the electrically reversible cold side becomes the electrically reversible hot side;

at least one back rest and seat loop liquid beat exchanger attached to the temperature transfer medium transport means wherein when the temperature transfer medium transport means is activated the temperature transfer medium is pumped from the back rest and/or the seat through the back rest and seat loop liquid heat exchanger and back to the back rest and/or the seat;

the back rest and seat loop liquid beat exchanger having a front side and a back side either or both of which is formed by the electrically reversible cold side of the reversible thermoelectric cooler module such that the temperature transfer medium makes direct contact with the electrically reversible cold side of the reversible thermoelectric cooler module when pumped through the back rest and heat loop liquid heat exchanger when the temperature sensor communicates to the user adjustable electronic controller that the temperature of the back rest and/or the seat is higher than the user selected temperature and in the event that the temperature sensor communicates to the user adjustable electronic controller that the temperature of the back rest and/or the seat is lower than the user selected temperature the user adjustable electronic controller automatically reverses the direction of the reversible direct current of electricity that is pulsed from the user adjustable electronic controller such that the electrically reversible cold side of the reversible thermoelectric cooler module becomes the electrically reversible hot side of the reversible thermoelectric cooler module which remains in direct contact with the temperature transfer medium;

at least one cooling fin attached to the electrically reversible hot side of the reversible thermoelectric cooler module when the temperature sensor communicates to the user adjustable electronic controller that the temperature of the back rest and/or the seat is higher than the user selected temperature; and at least one cooling fin 6n that is electrically attached to and activated by the user adjustable electronic controller when the temperature sensor communicates to the user adjustable electronic controller that the temperature of the back rest and/or the seat is higher than the user selected temperature thereby blowing ambient air over the cooling fin drawing heat therefrom and then discharging the now heated blown ambient air into the surrounding ambient sir.

13. The personal back rest and seat cooling and heating system of claim 1 wherein the back rest and the seat are each further comprised of:

at least one liquid pack;

the liquid pack having a liquid pack fluid contained therein;

the liquid pack having a liquid pack cold side and a liquid pack hot side;

at least one reversible thermoelectric cooler module electrically attached to and activated by a reversible direct current of electricity that is pulsed from the user adjustable electronic controller in one direction when the temperature sensor communicates to the user adjustable electronic controller that the temperature of the back rest and/or the seat is higher than the user selected temperature and in the event that the temperature sensor communicates to the user adjustable electronic controller that the temperature of the back rest and/or the seat is lower than the user selected temperature the user adjustable electronic controller automatically reverses the direction of the reversible direct current of electricity that is pulsed from the user adjustable electronic controller;

the reversible thermoelectric cooler module having an electrically reversible hot side and an electrically reversible cold side which is reversed by the user adjustable electronic controller reversing the direction of the pulsed reversible direct current such that the electrically reversible hot side becomes the electrically reversible cold side and the electrically reversible cold side becomes the electrically reversible hot side;

the liquid pack hot side of the liquid pack being formed by the electrically reversible cold side of the of the reversible thermoelectric cooler module such that the liquid pack fluid makes direct contact with the electrically reversible cold side of the reversible thermoelectric cooler module when the temperature sensor communicates to the user adjustable electronic controller that the temperature of the back rest and/or the seat is higher than the user selected temperature and in the event that the temperature sensor communicates to the user adjustable electronic controller that the temperature of the back rest and/or the seat is lower than the user selected temperature the user adjustable electronic controller automatically reverses the direction of the reversible direct current of electricity that is pulsed from the user adjustable electronic controller such that the electrically reversible cold side of the reversible thermoelectric cooler module becomes the electrically reversible hot side of the reversible thermoelectric cooler module which remains in direct contact with the liquid pack fluid; and the cooling means of the personal back rest and seat cooling and heating system of claim 1 being further comprised of:

at least one air heat exchanger;

the air heat exchanger having at least one air channel there through;

at least one air heat exchanger fan attached to the air beat exchanger;

at least one cooling Loop liquid heat exchanger;

at least one cooling loop pump means capable of pumping the cooling liquid from the cooling loop liquid heat exchanger to and through the air heat exchanger cooling liquid channel and then back to the cooling loop liquid heat exchanger;

the cooling loop pump means being electrically attached to and activated by the user adjustable electronic controller when the temperature sensor communicates to the user adjustable electronic controller that the temperature of the back rest and/or the seat is higher than the user selected temperature;

the cooling loop liquid heat exchanger having a cooling front side and a cooling back side either or both of which are formed by the electrically reversible hot side of the reversible thermoelectric cooler module, the electrically reversible cold side of which is used to form the liquid pack hot side of the liquid pack, such that the cooling liquid makes direct contact with the electrically reversible hot side of the reversible thermoelectric cooler module when pumped through the cooling loop liquid heat exchanger when the temperature sensor communicates to the user adjustable electronic controller that the temperature of the back rest and/or the seat is higher than the user selected temperature; and the air heat exchanger fan being electrically attached to and activated by the user adjustable electronic controller when the temperature sensor communicates to the user adjustable electronic controller that the temperature of the back rest and/or the seat is higher than the user selected temperature by electrically activating the air heat exchanger fan which blows ambient air through the air channel of the air heat exchanger that has been heated by the circulating of the cooling liquid therein and then discharging the now heated blown ambient air into the surrounding ambient air.

14. The personal back rest and seat cooling and heating system of claim 13 wherein the heating means is comprised of:

at least one electric heating strip attached to the electrically reversible cold side of the reversible thermoelectric cooler module which is the electrically reversible cold side when the temperature sensor communicates to the user adjustable electronic controller that the temperature of the back rest and/or the seat is lower than the user selected temperature.

15. The personal back rest and seat cooling and heating system of claim 14 wherein the heating means is comprised of:

at least one electric heating strip attached to the electrically reversible cold side of the reversible thermoelectric cooler module which is the electrically reversible cold side when the temperature sensor communicates to the user adjustable electronic controller that the temperature of the back rest and/or the seat is lower than the user selected temperature.

16. A personal back rest and seat cooling and heating system according to claims 1,2,3,4,5,6,7,8,9,10,11,12,13,14 or 15 in which the back rest and/or the seat are convertible to a mattress suitable for a user to lie thereon.

* * * * *